(12) United States Patent
Kalmuk et al.

(10) Patent No.: US 12,417,126 B2
(45) Date of Patent: Sep. 16, 2025

(54) DYNAMIC RENEWABLE RUNTIME RESOURCE MANAGEMENT

(71) Applicant: INTERNATIONAL BUSINESS MACHINES CORPORATION, Armonk, NY (US)

(72) Inventors: David Kalmuk, Markham (CA); Scott Douglas Walkty, Toronto (CA); Faizan Qazi, Maple (CA); Patrick R Perez, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 17/351,606

(22) Filed: Jun. 18, 2021

(65) Prior Publication Data

US 2022/0405133 A1 Dec. 22, 2022

(51) Int. Cl.
G06F 9/46 (2006.01)
G06F 9/48 (2006.01)
G06F 9/50 (2006.01)

(52) U.S. Cl.
CPC ............ G06F 9/505 (2013.01); G06F 9/4881 (2013.01); G06F 9/5016 (2013.01); G06F 2209/5022 (2013.01)

(58) Field of Classification Search
CPC ...... G06F 9/505; G06F 9/4881; G06F 9/5016; G06F 2209/5022
See application file for complete search history.

(56) References Cited

U.S. PATENT DOCUMENTS

| 7,657,501 B1 | 2/2010 | Brown et al. |
| 7,870,568 B2 | 1/2011 | Bernardin et al. |
| 8,495,646 B2 | 7/2013 | Uchida |

(Continued)

FOREIGN PATENT DOCUMENTS

| CN | 105868025 | 8/2016 |
| CN | 106527666 | 3/2017 |

(Continued)

OTHER PUBLICATIONS

Arzuaga et al., Quantifying Load Imbalance on Virtualized Enterprise Servers, ACM 978-1-60558-563, 2010, pp. 235-242. (Year: 2010).*

(Continued)

*Primary Examiner* — Diem K Cao
(74) *Attorney, Agent, or Firm* — Monchai Chuaychoo; Andrew D. Wright; Calderon Safran & Wright P.C.

(57) ABSTRACT

A system and method is provided for dynamic renewable runtime resource management in response to flexible resource allocations by a processor. In embodiments, a method includes: calculating, by a processor of a system, a resource consumption value of a first workload by aggregating allocation values of persistent resources currently allocated to the first workload by the processor; determining, by the processor, that the resource consumption value of the first workload is greater than a predefined resource allocation target for the first workload; and temporarily adjusting, by the processor, a renewable runtime resource target of the first workload from an initial target value to a temporary target value based on the resource consumption value.

20 Claims, 8 Drawing Sheets

(56) References Cited

U.S. PATENT DOCUMENTS

| | | | | |
|---|---|---|---|---|
| 8,706,798 | B1* | 4/2014 | Suchter | H04L 47/83 709/224 |
| 9,223,623 | B2* | 12/2015 | Gujarathi | G06F 16/00 |
| 9,244,744 | B2 | 1/2016 | Bird et al. | |
| 9,325,585 | B1 | 4/2016 | Wang et al. | |
| 2005/0210470 | A1 | 9/2005 | Chung et al. | |
| 2009/0037922 | A1* | 2/2009 | Herington | G06F 9/505 718/104 |
| 2011/0239220 | A1* | 9/2011 | Gibson | G06F 1/3206 718/103 |
| 2013/0185729 | A1* | 7/2013 | Vasic | G06F 9/5072 718/104 |
| 2013/0305245 | A1* | 11/2013 | Doddavula | G06F 9/5083 718/1 |
| 2015/0355943 | A1* | 12/2015 | Harris | G06F 9/5083 718/104 |
| 2018/0027062 | A1* | 1/2018 | Bernat | H04B 10/25891 709/224 |
| 2020/0264928 | A1* | 8/2020 | Kalmuk | G06F 9/5011 |
| 2020/0341798 | A1 | 10/2020 | Duleba | |

FOREIGN PATENT DOCUMENTS

| | | | | |
|---|---|---|---|---|
| CN | 109992422 A | * | 7/2019 | G06F 9/4881 |
| CN | 110399213 A | * | 11/2019 | G06F 9/5016 |
| CN | 112148496 | | 12/2020 | |
| WO | 2017123554 | | 7/2017 | |

OTHER PUBLICATIONS

Shen, RIAL: Resource Intensity Aware Load BAlancing in Clouds, IEEE, 2017, 14 pages. (Year: 2017).*
Pace et al., "A Data-Driven Approach to Dynamically Adjust Resource Allocation for Compute Clusters", Jul. 1, 2018, 15 pages.
Anonymous, "Managing Resources with Oracle Database Resource Manager", https://docs.oracle.com/cd/E11882_01/server.112/e25494/dbrm.htm#A, accessed Apr. 28, 2021, 73 pages.
Krishna et al., "Dynamic Resource Allocation And Job Scheduling To Enhance The Performance Of HPC With SDN—A Review", International Journal of Scientific & Technology Research vol. 9, Issue 01, Jan. 2020, 8 pages.
Sheahan, "Dynamic Resource Allocation of Computer Clusters with Probabilistic Workloads", Jan. 2006, 10 pages.
Mell et al., "The NIST Definition of Cloud Computing", NIST, Special Publication 800-145, Sep. 2011, 7 pages.
Almeida et al., "Joint admission control and resource allocation in virtualized servers", Sep. 6, 2009, 19 pages.
Huang et al., "An Integrated Processor Allocation and Job Scheduling Approach to Workload Management on Computing Grid", accessed Jun. 19, 2021, 7 pages.
Zhang et al. "Dynamic Workload Management in Heterogeneous Cloud Computing Environments", 2014, 7 pages.
International Search Report and Written Opinion of the International Searching Authority dated Aug. 11, 2022 in PCT Application No. PCT/CN2022/091844, 9 pages.

* cited by examiner

DYNAMIC RENEWABLE RUNTIME RESOURCE MANAGEMENT

BACKGROUND

Aspects of the present invention relate generally to workload management and, more particularly, to dynamic renewable runtime resource management in response to flexible resource allocations.

Workload management systems exist that allow a set of shared machine resources to be subdivided amongst the needs of multiple user-defined workloads in order to manage persistent/fixed resources like memory units and worker threads that are assigned for a longer duration of time (often at the granularity of scheduling of an individual job), as well as renewable runtime resources like Central Processing Unit (CPU), Input/Output (IO) and network bandwidth that are consumed in a transient fashion during the execution of a job.

SUMMARY

In a first aspect of the invention, there is a computer-implemented method including calculating, by a processor of a system, a resource consumption value of a first workload by aggregating allocation values of persistent resources currently allocated to the first workload by the processor. The method also includes determining, by the processor, that the resource consumption value of the first workload is greater than a predefined resource allocation target for the first workload. The processor also temporarily adjusts a renewable runtime resource target of the first workload from an initial target value to a temporary target value based on the resource consumption value.

In another aspect of the invention, there is a computer program product including one or more computer readable storage media having program instructions collectively stored on the one or more computer readable storage media. The program instructions are executable by a processor managing execution of jobs in a system to calculate a resource consumption value of a first workload by aggregating allocation values of persistent resources currently allocated to the first workload by a job scheduling module. The program instructions further cause the processor to determine whether the resource consumption value of the first workload is greater than a predefined resource allocation target for the first workload in response to a job being admitted into the system. The program instructions also cause the processor to temporarily increase a renewable runtime resource target of the first workload from an initial target value of the first workload to a temporary target value of the first workload in response to determining that the resource consumption value of the first workload is greater than the user-defined resource allocation target for the first workload.

In another aspect of the invention, there is system including a processor, a computer readable memory, one or more computer readable storage media, and program instructions collectively stored on the one or more computer readable storage media. The program instructions are executable to calculate a resource consumption value of a first workload by aggregating allocation values of persistent resources currently allocated to the first workload by a job scheduling module using predetermined resource weighting values. The program instructions are further executable to determine whether the resource consumption value of the first workload is greater than a user-defined resource allocation target for the first workload in response to a job of the first workload or another workload being admitted into the system. The program instructions are also executable to temporarily increase a renewable runtime resource target of the first workload from an initial target value of the first workload to a temporary target value of the first workload in response to determining that the resource consumption value of the first workload is greater than the user-defined resource allocation target for the first workload. The program instructions are additionally executable to determine whether to revert the renewable runtime resource target from the temporary target value of the first workload to the initial target value of the first workload in response to a job of the first workload completing.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
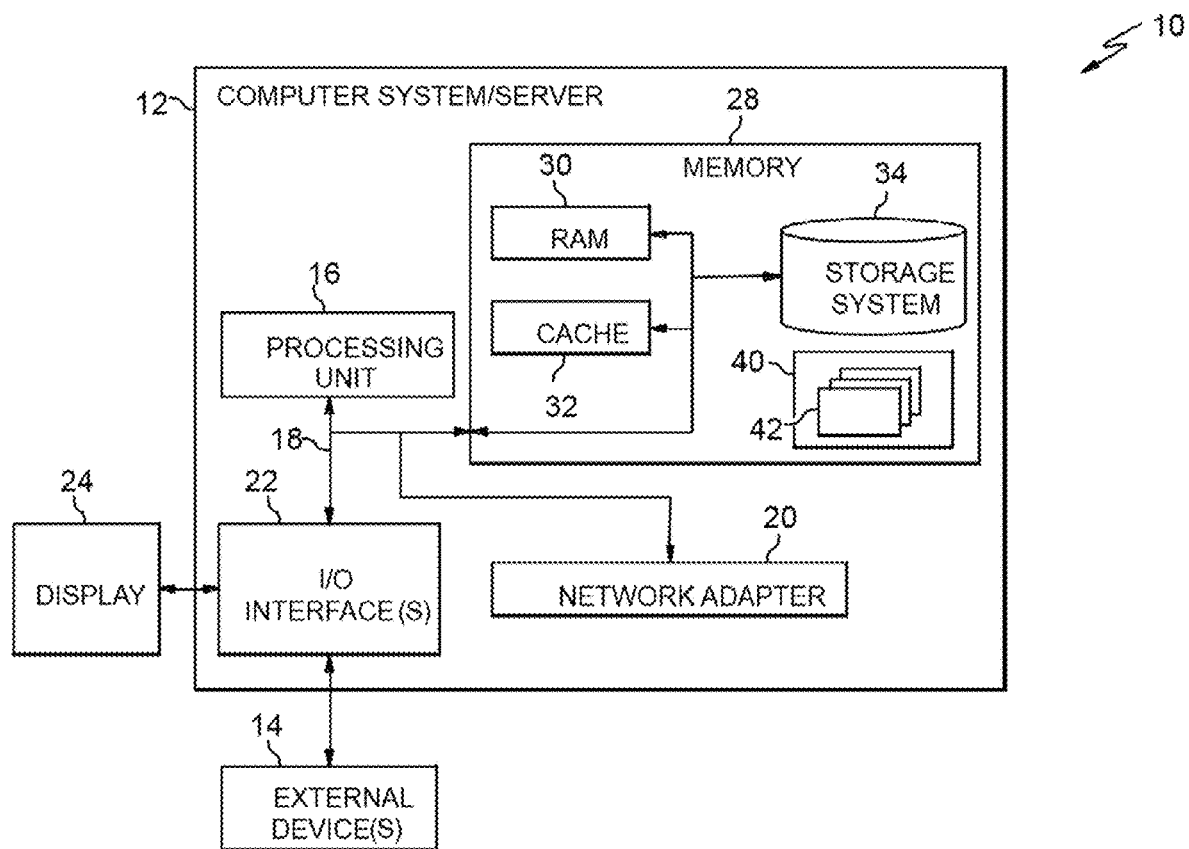
FIG. 1 depicts a cloud computing node according to an embodiment of the present invention.

Aspects of the present invention relate generally to workload management and, more particularly, to dynamic renewable runtime resource management in response to flexible resource allocations. According to aspects of the invention, a workload management system and method is provided to dynamically and continuously adjust renewable runtime resource targets based on a dynamic weighting of the persistent resources a job scheduler has allocated at a given point in time. In doing so, implementations of embodiments of the invention ensure that renewable runtime resource targets are in proportion with job scheduling resource assignments in order to avoid inefficiencies that may arise when a current persistent resource allocation temporarily deviates from set allocation targets. For example, a resource allocation may temporarily deviate from a set allocation target to enable a workload to utilize an under-utilized resource, and may revert back to the set allocation target when a predetermined event occurs (e.g., the workload or job finishes, another workload or job is initiated or ends, the temporary deviation interferes with set allocation targets of one or more other workloads or jobs, etc.)

Complete workload management solutions may include both a job scheduling/admission control element and a control element for managing renewable runtime resources while a scheduled job is executing. Different workload management models exist to address how these controls are exposed to users and how the job scheduling and runtime control interact.

Some workload management models cover a range of approaches for managing persistent resource allocations through job scheduling, as well as managing dynamic/renewable runtime resources. One workload management model controls job scheduling through a definition of fixed concurrency limits for each user-defined workload. In this type of model, admission behavior controlling allocation of persistent resources is relatively static, and the renewable runtime resource control will be largely decoupled from the admission control and may take the form of a relative percentage or share division between workloads. This relatively static admission behavior enables a corresponding runtime division to be determined to work with the expected balance of jobs.

One flexible workload management approach utilizes a dynamic percentage or share division to reflect the division of persistent resources for job scheduling purposes. In this case, a computing device (e.g., a workload manager server) makes the determination of job resource requirements predictively in order to schedule jobs to meet the configured balance. Unlike workload management models that control only by fixed limits (fixed allocation targets), this type of model may allow flexible resource targets where a workload is allowed to exceed its resource allocation target temporarily when there is excess idle capacity available on the system.

In this flexible workload management approach, the configuration of persistent resource allocations used for job scheduling may be combined with the renewable runtime resource allocation for simplicity from an end user perspective. One straightforward model for implementing this is to apply a single share division first in the job scheduler when performing admission decisions in order to adhere to the predefined division/entitlement allocations, and then apply it again independently for the renewable runtime resources during execution. For further flexibility the renewable runtime resource share can be made optionally configurable as a separate allocation.

A challenge that can arise with this flexible model however, is that even though the allocations/resource targets between the persistent resources and renewable runtime resources are the same for a given workload definition, the dynamic nature of the job scheduling means that the weighting of tasks admitted at any given point across workloads may deviate from the defined allocations. This might happen, for example, in a case where one workload has a relatively large number of incoming jobs while another workload has relatively few incoming jobs, such that the first workload is allowed to temporarily exceed its target allocation. This could potentially lead to a scenario where the renewable runtime resource allocations are essentially "fighting" against the job scheduling allocations.

Advantageously, embodiments of the invention address the technical problem of aligning renewable runtime resource allocations and job scheduling allocations in workload management systems with flexible resource targets, by implementing a technical solution of dynamically adjusting the targets for renewable runtime resource control on the fly to maintain alignment with persistent resource allocations when they temporarily deviate from overall resource targets.

In one example, a computer-implemented process for dynamic job scheduling weighting renewable runtime resource control is provided, wherein the process includes: evaluating, during workload execution by a job scheduling component of a workload manager server, incoming jobs from each workload having a single resource target assigned for each workload, to determine a time and order to schedule the incoming jobs to adhere to a user defined resource division within capacity limits of a system using a current allocation of persistent resources assigned to each workload; computing, using respective individual resource allocations, a single resource consumption value by aggregating the respective individual resource allocations using a predetermined weighting; and monitoring a resource division between workloads using the resource consumption value by the workload manager server while admission decisions are made. In response to a determination that the resource consumption value stays below a predetermined target allocation, no changes are made to the runtime targets. In response to a determination that the resource consumption value will exceed the predetermined target allocation due to a first workload, the process includes making a temporary adjustment to renewable runtime resources targets in proportion to computed resource values to reflect a change in job scheduling weighting. In response to a determination, after the temporary adjustment, of jobs completing in the first workload relinquishing persistent resources, the process includes reducing a temporarily increased runtime target for the first workload and replenishing an original target for other workloads.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
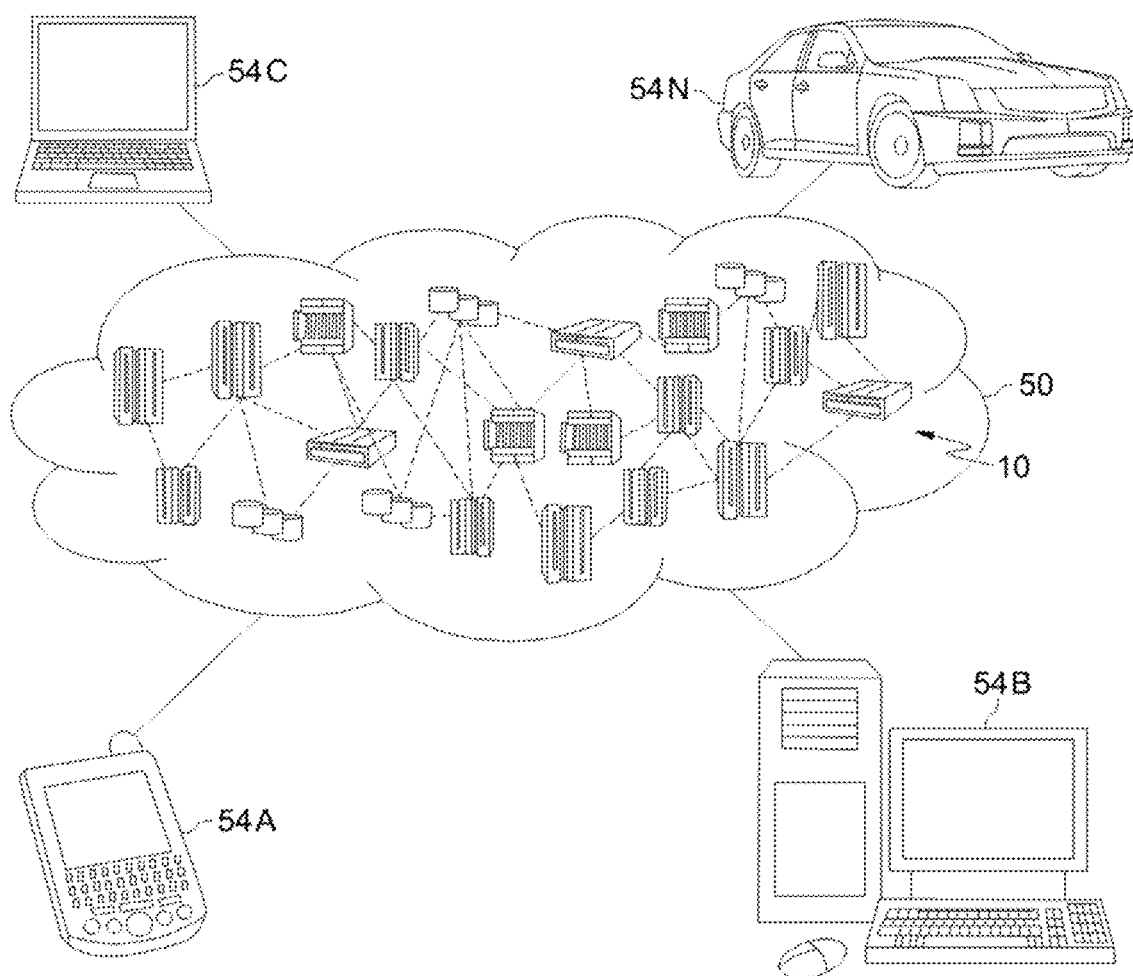
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
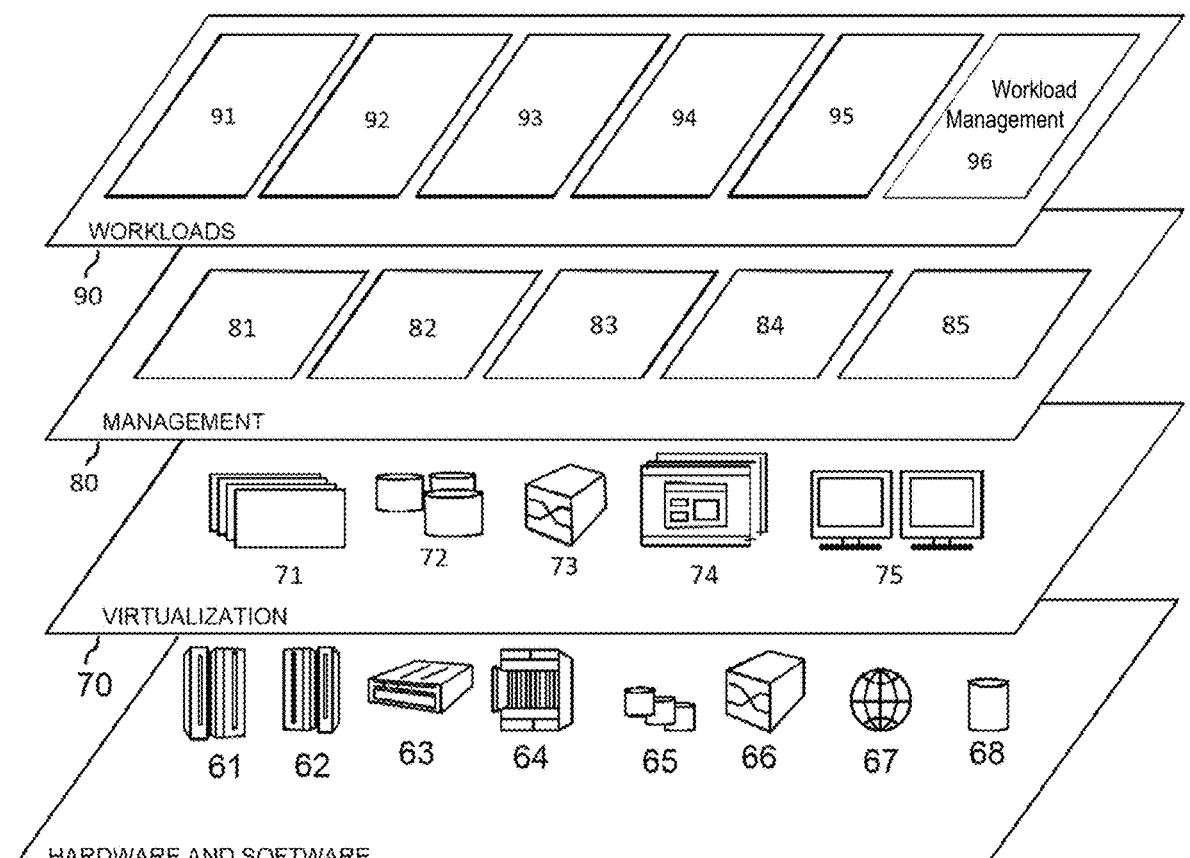
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload management 96.

Implementations of the invention may include a computer system/server 12 of FIG. 1 in which one or more of the program modules 42 are configured to perform (or cause the computer system/server 12 to perform) one of more functions of the workload management 96 of FIG. 3. For example, the one or more of the program modules 42 may be configured to: determine that a first workload and a second workload have been executed; evaluate incoming jobs of the first and second workloads and schedule execution of jobs based on predetermined resource allocation targets; monitor current allocations of persistent resources assigned to each of the first and second workloads; initiate a computation of a resource consumption value based on a new job being submitted to a computing system; monitor division of persistent resources between the first and second workloads to determine whether the resource consumption value is at or below the predetermined resource allocation targets; when the resource consumption value is at or below the predetermined resource allocation target of the first and second workloads, maintain the current renewable runtime resource targets; when the resource consumption value is above the predetermined resource allocation target of a workload, temporarily adjust the renewable runtime resource targets of the first and second workloads in proportion to the resource consumption value; when a job exits the computing system, determine if the resource consumption value is at or below the predetermined resource allocation targets of the first or second workloads; when the resource consumption value is at or below the predetermined resource allocation targets of the first and second workloads, revert to the original renewable runtime resource targets, when necessary; when the resource consumption value is above the predetermined resource allocation target of a workload, make a temporary adjustment to the renewable runtime resource targets of the workloads in proportion to the resource consumption value; and repeat adjustments as needed as jobs enter and exit the computing system to dynamically adjust renewable runtime resource allocations as needed.

Figure 4:
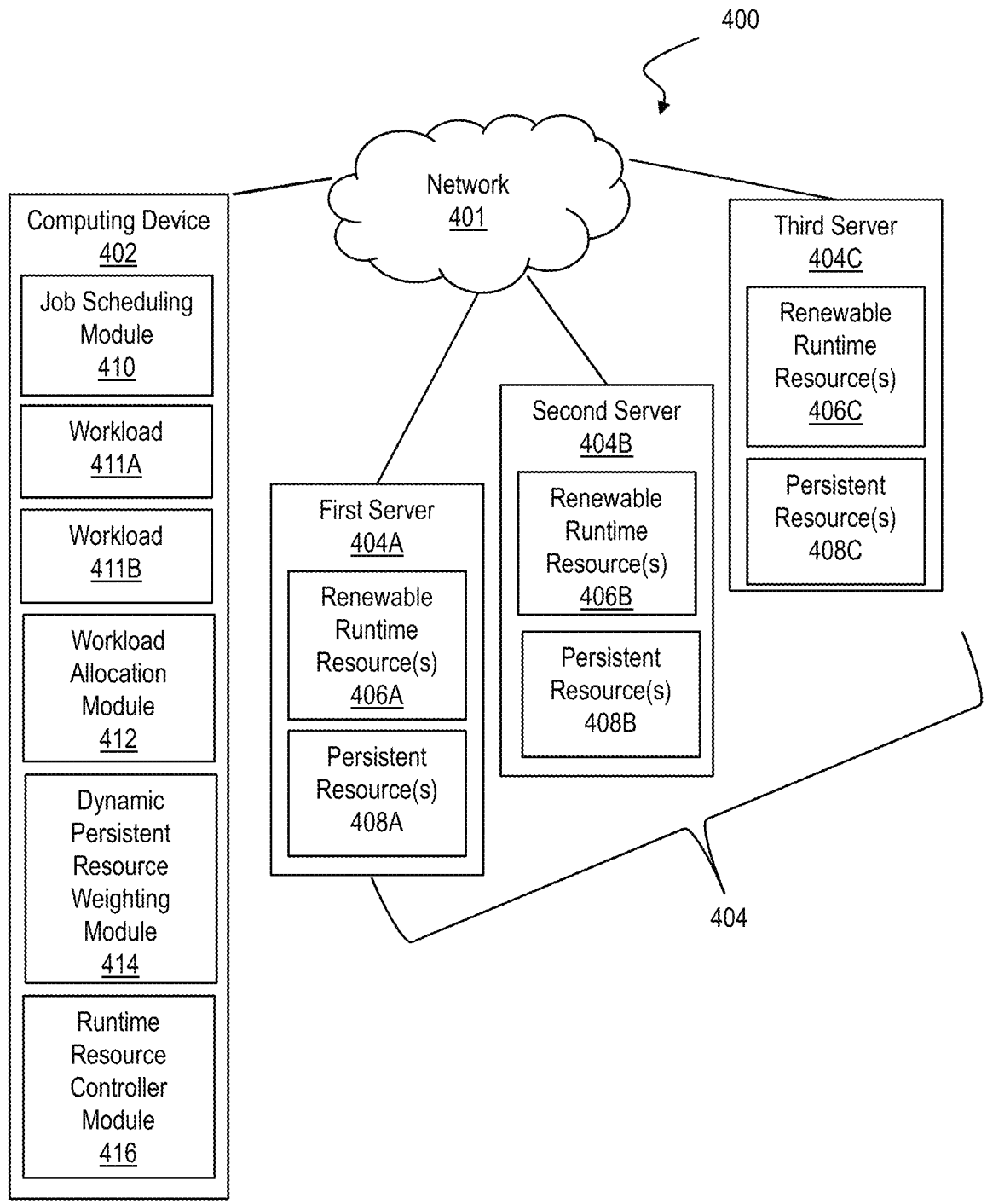
FIG. 4 shows a block diagram of an exemplary environment in accordance with aspects of the invention.

FIG. 4 shows a block diagram of an exemplary workload management environment 400 in accordance with aspects of the invention. In embodiments, the workload management environment 400 includes a network 401 enabling communication between a computing device 402 for managing workloads (for example, a workload manager server) and a plurality of servers 404 (represented by first, second and third servers 404A-404C). Each of the plurality of servers 404 includes one or more renewable runtime resources (represented by renewable runtime resource(s) 406A-406C) and one or more persistent resources (represented by persistent resource(s) 408A-408C). The term persistent resources as used herein refers to fixed resources including memory units (e.g., memory 28 of FIG. 1) and threads that are assigned for a duration of time (often at the granularity of the scheduling of an individual job). The term renewable runtime resource as used herein refers to a renewable resource like a CPU, an IO, and network bandwidth that are consumed in a transient fashion during the execution of a job. Each of the servers 404 may comprise the computer system/server 12 of FIG. 1, or elements thereof. The servers 404 may be computing nodes 10 in the cloud computing environment 50 of FIG. 2.

In embodiments, the computing device 402 comprises one or more modules, each of which may comprise one or more program modules such as program modules 42 described with respect to FIG. 1. In implementations, the computing device 402 includes a processor (e.g., processing unit 16 of FIG. 1), a computer readable memory (e.g., memory 28 of FIG. 1), one or more computer readable storage media (e.g., computer readable storage media 40), and program instructions (e.g., program module(s) 42 of FIG. 1) collectively stored on the one or more computer readable storage media, wherein the program instructions executable by the processor to perform one or more of the functions described herein.

In the example of FIG. 4, the computing device 402 includes a job scheduling module 410 (comprising program module(s) 42 of FIG. 1, for example) configured to schedule the execution of jobs of workloads (e.g., workload 411A and workload 411B) utilizing the resources of one or more of the servers 404. In implementations, the job scheduling module 410 comprises a computer application for controlling unattended background program execution of jobs (e.g., batch scheduling). FIG. 4 also depicts a workload allocation module 412 (e.g., comprising program module(s) 42 of FIG. 1) configured to determine when workloads (e.g., workload 411A and workload 411B) have been executed, track the allocation of persistent resources currently assigned to each of the workloads, and initiate a dynamic persistent recourse weighting module 414 (e.g., comprising program module(s) 42 of FIG. 1) to compute a single resource consumption value for each of the current allocations of persistent resources. The example of FIG. 4 also includes a runtime resource controller module 416 (e.g., comprising program module(s) 42 of FIG. 1) configured to control the allocation of renewable runtime resources to jobs of the workloads (e.g., perform process scheduling for workloads 411A and 411B).

In embodiments, the term workload refers to an amount of work (or load) that software imposes on underlying computing resources. In one example, the term workload refers to a grouping of active client sessions identified by one or more session attributes. For example, all incoming business intelligence software connections may be identified via a session authorization identification, in order for the computing device 402 to group them into a defined "workload" for management. In one example, all incoming connections from Cognos® business intelligence software may be identified by a session authorization identification "CognosBatchReports". Cognos® is a registered trademark of International Business Machines Corporation. Different types of workloads (groupings) may be referred to as service classes.

The computing device 402 may comprise the computer system/server 12 of FIG. 1, or elements thereof. The computing device 402 may be a computing node 10 of the cloud computing environment 50 of FIG. 2. In implementations, the computing device 402 is a special-purpose computing device (e.g., a workload manager server) in the cloud computing environment 50 of FIG. 2, providing workload management of cloud-based resources for computing devices used by cloud consumers (e.g., the desktop computer 54B). In other embodiments, the computing device 402 provides workload management of on premise resources for computing devices of a company or entity.

The computing device 402 and the servers 404 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the workload management environment 400 may include additional devices and/or networks; fewer devices and/or networks; different devices and/or networks; or differently arranged devices and/or networks than illustrated in FIG. 4.

Figure 5:
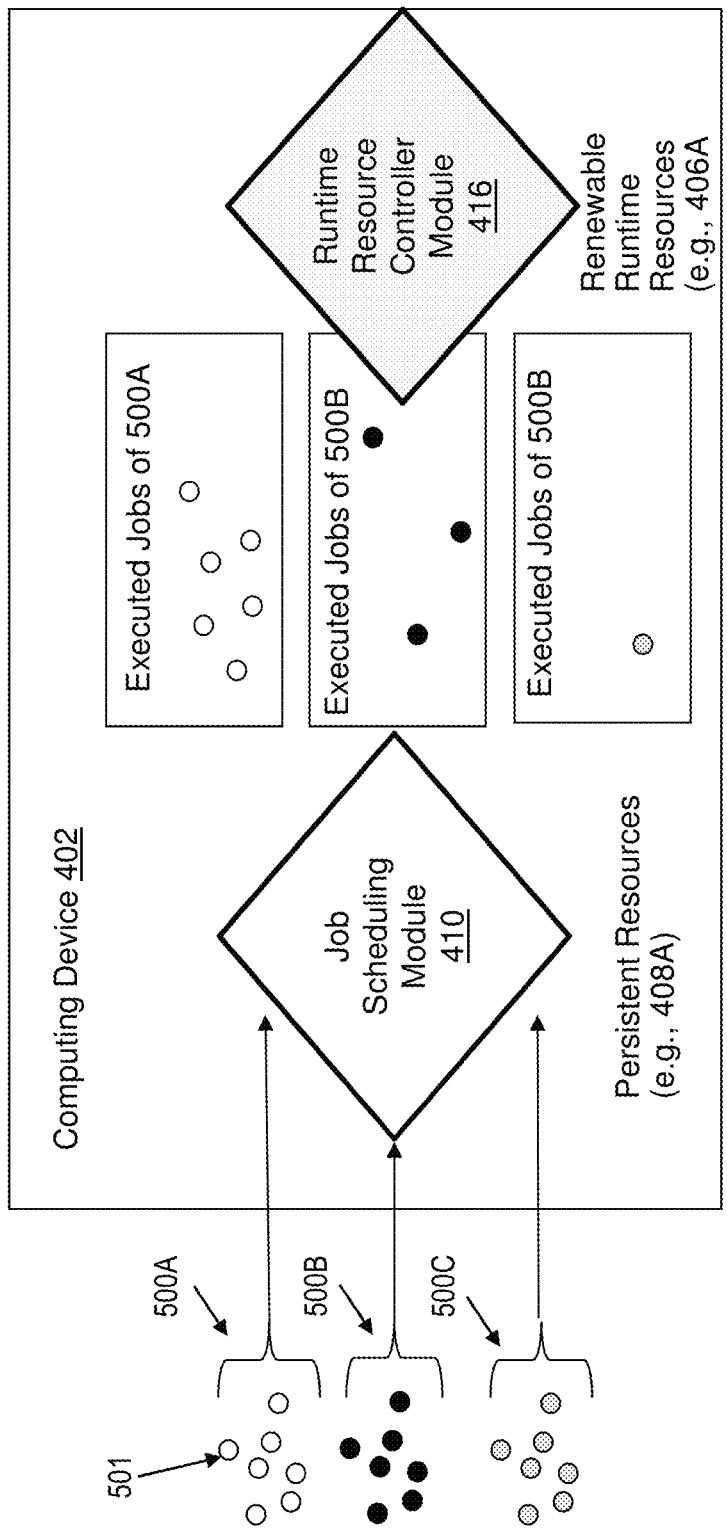
FIG. 5 depicts an exemplary job scheduling scenario in accordance with aspects of the present invention.

FIG. 5 depicts an exemplary job scheduling scenario in accordance with aspects of the present invention. The computing device 402 is responsible for determining when to allow jobs from user sessions to be executed, and what portion of database resources (e.g., persistent resources 408A-408C) the jobs are allowed to consume during execution. As depicted in FIG. 5, the computing device 402 receives a plurality of structured query language (SQL) requests 500A, 500B and 500C, each of which includes a plurality of jobs represented by 501, for example. As depicted, the job scheduling module 410 of the computing device 402 receives the SQL requests and schedules the execution of the jobs 501 with respect to persistent resources, such as memory units and worker threads. The term worker threads refers to threads waiting for a job to be assigned, so that it may execute the job (e.g., the computing device 402 receives a job request and assigns it to a thread from its pool of processing resources). Additionally, the runtime resource manager controller module 416 controls the use of renewable runtime resources (e.g., 406A-406C), such as CPU, IO and network bandwidth, during execution of one or more jobs.

Figure 6A:
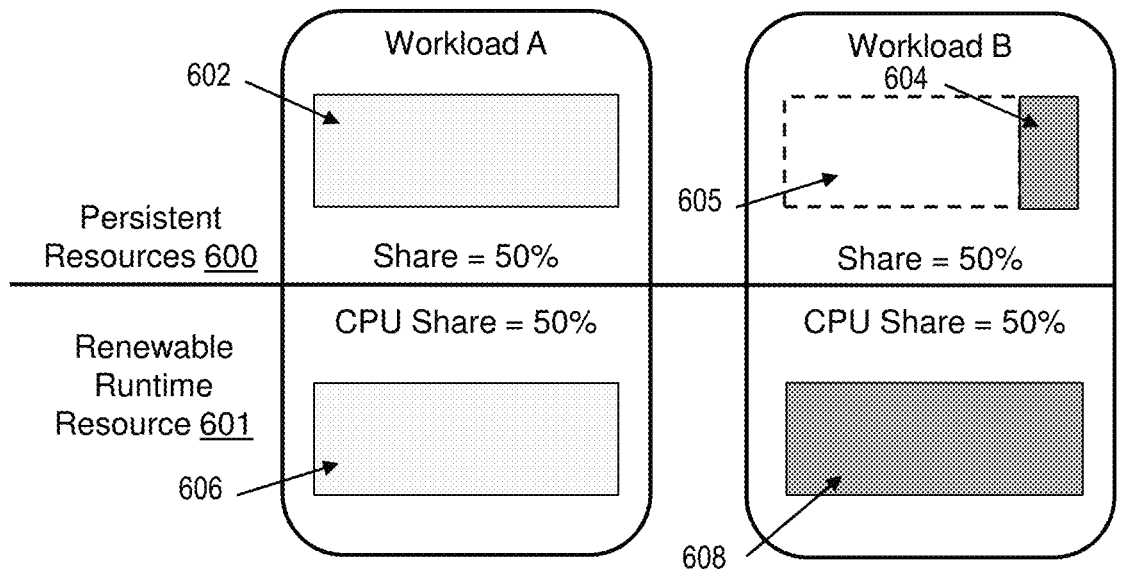
FIG. 6A is a diagram illustrating a first scenario utilizing a static resource management model.

FIG. 6A is a diagram illustrating a first scenario utilizing a static resource management model, wherein persistent and renewable runtime resources are allocated for workloads A and B based on predetermined target allocations (e.g., shares of resources allocated to each workload). In this scenario, a job scheduling module of a workload manager server allocates persistent resources 600 (e.g., memory units and worker threads) and renewable runtime resource 601 (e.g., a CPU) to the workloads A and B based on the predetermined target allocations. In the example of FIG. 6A, the predetermined target allocation for workload A is 50% of persistent resources 600 and 50% of a CPU (of renewable runtime resources 601). During a certain time period, the workload A actually utilized 50% of persistent resources as represented at 602, but the workload B only utilizes approximately 10% of the persistent resources, as indicated at 604, leaving approximately 40% of available persistent resources unutilized, as indicated at 605. In the scenario of FIG. 6A, the workload A utilizes 50% of the renewable runtime resources 601 as indicated at 606, and the workload B utilizes 50% of the renewable runtime resources 601 as indicated at 608 based on the predetermined target allocations.

In contrast to the static resource management model of FIG. 6A, a flexible resource allocation model enables the flexible allocation of persistent resources. The dynamic nature of job scheduling means that the weighting of jobs or tasks admitted at any given point across workloads may deviate from predefined allocation targets, potentially leading to an undesirable scenario where the renewable runtime resource allocations are essentially "fighting" against the job scheduling allocations. This scenario is depicted in FIG. 6B.

Figure 6B:
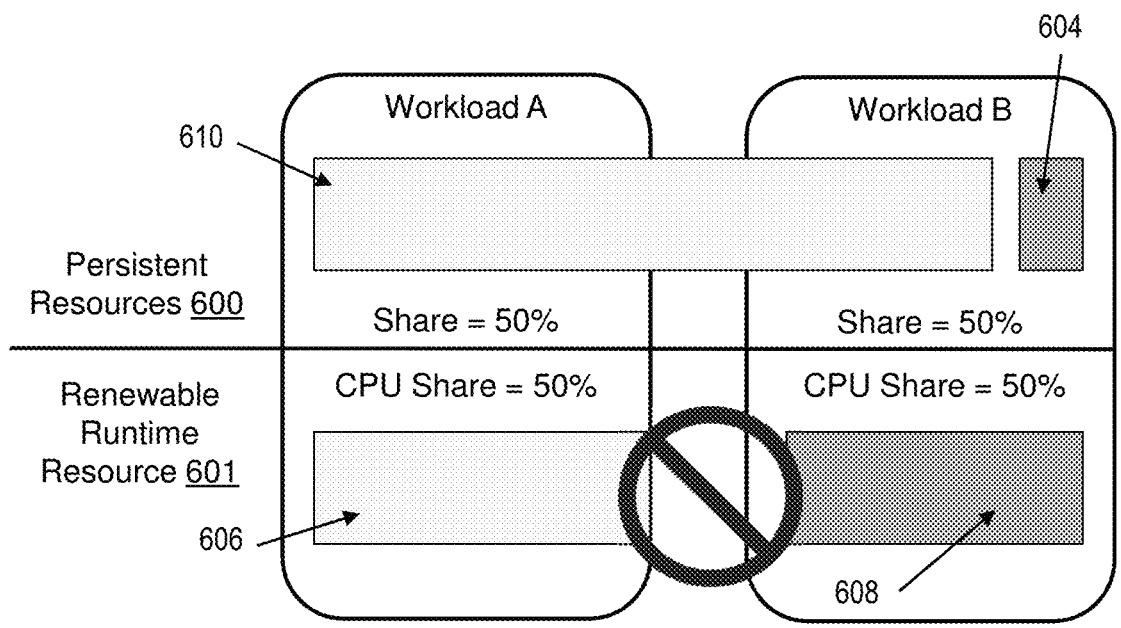
FIG. 6B illustrates an undesirable scenario that may occur if a temporary reallocation of persistent resources is made to a workload, but the allocation of renewable runtime resources to workloads remains static.

FIG. 6B illustrates an undesirable scenario that could occur if a temporary reallocation of persistent resources is made to workload A based on the first scenario of FIG. 6A, but the target allocation of renewable runtime resources to workloads A and B remains static. In this example, the job scheduling module of a workload manager server determines that workload B is not utilizing all available persistent resources allocated to it in the predetermined target allocations (50%), and temporarily allocates additional available persistent resources 600 to workload A, as indicated at 610. The allocation of renewable runtime resources 601 (e.g., CPU) to the workloads A and B remains unchanged, resulting in an imbalance between the allocation of renewable runtime resources 601 to workload A at 606, and the job scheduling allocation 610 of workload A.

In order to address the potential imbalance problem of FIB. 6B, embodiments of the invention provide a flexible workload management model that enables both the flexible allocation of persistent resources and dynamic adjustment of allocation targets for renewable runtime resource control, in order to maintain a more balanced alignment of persistent resource and renewable runtime resource allocation.

Figure 6C:
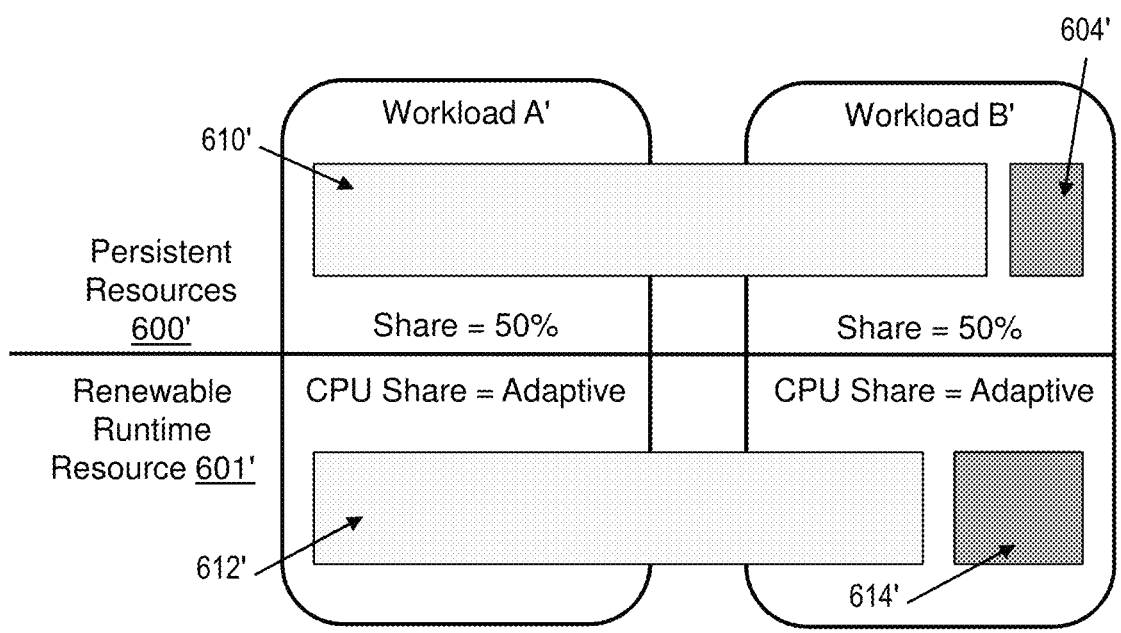
FIG. 6C is a diagram illustrating a third scenario in accordance with aspects of the invention, utilizing dynamic adjustment of allocation targets to balance renewable runtime resource allocation with flexible persistent resource allocations.

FIG. 6C is a diagram illustrating a third scenario in accordance with aspects of the invention, utilizing dynamic adjustment of allocation targets to balance renewable runtime resource allocation with flexible persistent resource allocations. In the scenario of FIG. 6C, persistent resources are temporarily reallocated for workload A', causing a proportional temporary redistribution of renewable runtime resources 601 for workloads A' and B'. In this example, a workload manager server (e.g., computing device 402) determines that workload B is not utilizing all available persistent resources allocated to it in the predetermined target allocations (50%), and temporarily allocates additional available persistent resources 600 to workload A, as indicated at 610'. Additionally, the workload manager server causes the temporary redistribution of renewable runtime resources 601' to workload A' and workload B' in proportion to the temporary distribution of persistent resources 600' to workload A' and workload B'. The result is an actual renewable runtime resources 601' usage for workload A' at 612' which is greater than the predetermined target allocation (50%), and an actual renewable runtime resources 601' usage for workload B' that is less than the predetermined target allocation (50%).

Figure 7:
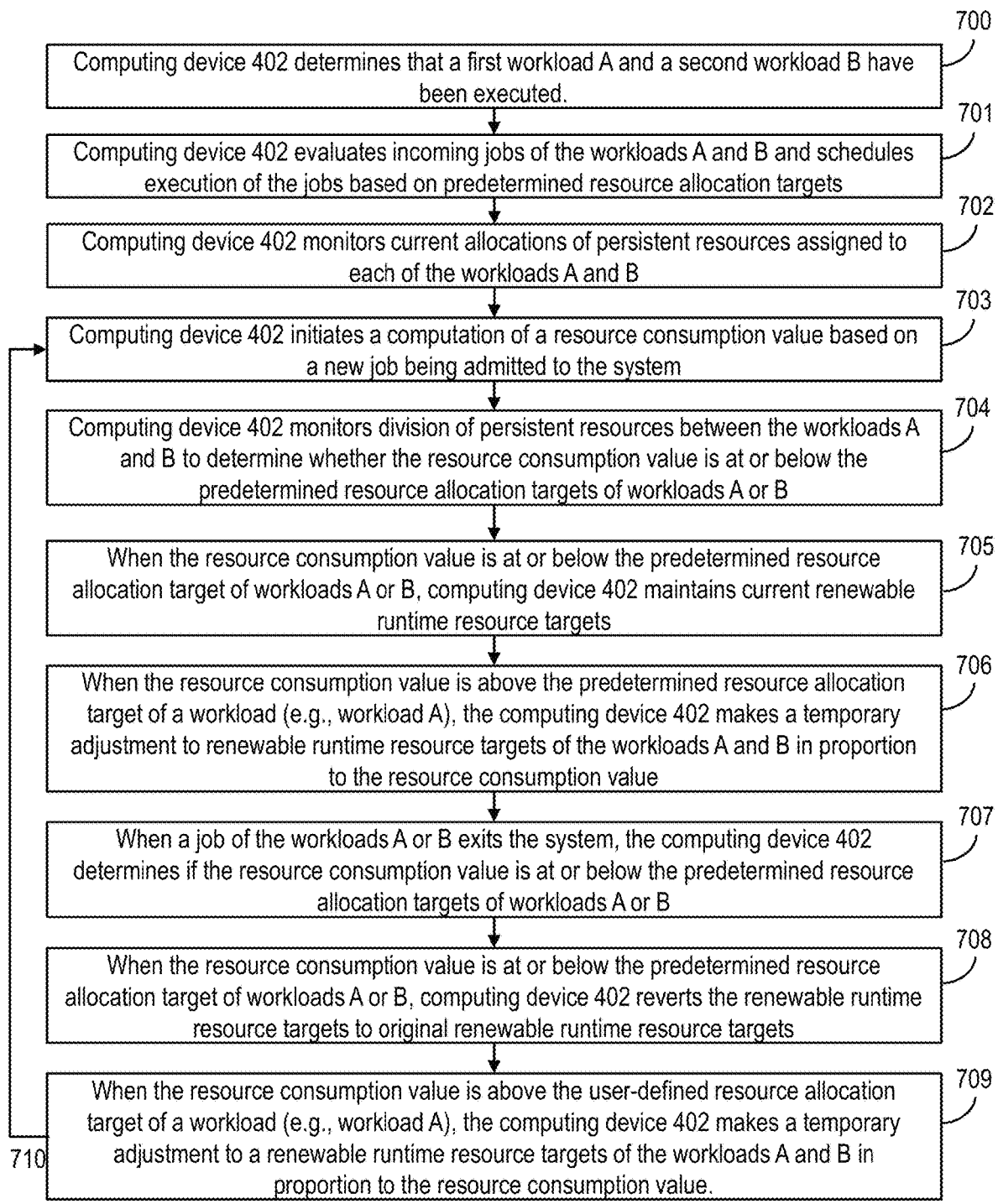
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4.

At step 700, the computing device 402 determines that a first workload A has been executed, and determines (either concurrently or consecutively) that a second workload B has been executed within a computer system. The computer system referred to herein may be comprised of a single computing device or server, or multiple computing devices or servers. For example, the computer system of FIG. 7 may comprise the computing device 402 and the cluster of servers 404 of FIG. 4.

In some embodiments, the term workload refers to a grouping of active client sessions identified by one or more session attributes. Each workload (e.g., workloads A and B) may comprise a plurality of jobs that utilize persistent and renewable runtime resources when executed. It should be understood that the term job refers to a unit of work, or a unit of execution that performs the work, in a computer environment. In embodiments, the job scheduling module 410 of the computing device 402 implements step 700. It should be understood that additional workloads could be determined by the computing device 402 at step 700, and workloads A and B are simply utilized herein for illustrative purposes. Various methods of determining the execution of workloads A and B may be utilized by computing device 402 at step 700, and the invention is not intended to be limited to a particular method of determined workload execution.

At step 701, the computing device 402 evaluates incoming jobs or tasks (hereafter jobs) from workloads A and B and determines/schedules a schedule time and a schedule order for execution of each of the incoming jobs based on predetermined resource allocation targets (e.g., user-defined resource allocation targets) of the workloads A and B, and system capacity limits (e.g., the capacity of system resources, such as the total amount of memory available, etc.). In embodiments, workloads A and B are each associated with at least one service class or subclass, which are utilized to organize work into recognizable, logical groupings. In aspects of the invention, a single predetermined resource allocation target is assigned for each workload (e.g., workloads A and B) defined in the system, and is used by the computing device 402 for performing both the assignment of persistent resources (through job scheduling), as well as the allocation of renewable runtime resources through a resource controller (e.g., runtime resource controller module 416). In one example, a user-defined resource target for workloads A and B is 50/50, meaning that 50% of resources should be allocated to workload A and 50% of resources should be allocated to workload B.

In embodiments of the invention, the predetermined resource allocation target is a soft or flexible resource target comprising a maximum amount of resources the workload or service class is allowed when resources are under competition with one or more other workloads or service classes, but which may be exceeded when there is spare resource capacity (e.g., other workload or service classes are not using their full resource entitlement). In embodiments, the predetermined resource allocation targets are assigned a neutral weighting, such as a percentage or relative share value that can be applied across all resources controlled by the computing device 402. In implementations, the computing device 402 makes scheduling decisions with the goal of adhering to the predetermined resource allocation targets while staying within system capacity limits. Various methods of scheduling the execution of jobs for workloads may be utilized by the computing device 402, and the invention is not intended to be limited to a particular method of scheduling jobs. In embodiments, the job scheduling module 410 of the computing device 402 implements step 701.

At step 702, the computing device 402 monitors or tracks current allocations of persistent resources assigned to each of the workloads A and B. In implementations, the computing device 402 tracks an amount of working memory allocated to each job of the workloads A and B, and a number of executable threads assigned to each job of the first and second workloads, across each server within a cluster of servers (e.g., servers 404 of FIG. 4). In embodiments, the workload allocation module 412 of the computing device 402 implements step 702. It should be understood that various mechanisms for workload definition, job scheduling and renewable runtime resource control may be utilized in implementations of the invention. In one example, the computing device 402 utilizes a workload management framework of the Db2® relational database engine, which is registered trademark of International Business Machines Corporation.

At step 703, the computing device 402 initiates the computation of a resource consumption value (a single value) based on a determination that a new job of workload A or workload B has been admitted to the system (e.g., executed within the environment 400 of FIG. 4). The resource consumption value is calculated based on current allocations of persistent resources monitored at step 702. In embodiments, the resource consumption value is calculated by aggregating each of the current resource allocation values of persistent resources of the system and, optionally, applying weighted values associated with each of the persistent resources. In one example, this calculation is performed as a simple average (e.g., weight values of resources are equal). In alternative embodiments, some resources are weighted different than others. In one example, a memory unit has a weighting of zero, such that the computing device 402 only considers the number of thread resources assigned when calculating the resource consumption value of step 703. In embodiments, the dynamic persistent resource weighting module 414 of the computing device 402 implements step 703.

At step 704, the computing device 402 monitors the division of persistent resources between the workload A and the workload B based on the resource consumption value to determine whether the resource consumption value computed at step 703 is below or equal to the a predetermined threshold value (i.e., the predetermined resource allocation target) of either workload A or workload B. In embodiments, the dynamic persistent resource weighting module 414 of the computing device 402 implements step 704.

At step 705, if the resource consumption value is below or equal to the predetermined threshold value at step 704, the computing device 402 does not make any changes to current renewable runtime resource targets (e.g., renewable runtime resource targets for a CPU and/or worker threads), which are based on the predetermined resource allocation target. In one example, when a target allocation value is 50/50 between the workload A and the workload B, and the current resource values indicate that the workload A is consuming 45% of the available persistent resources and the workload B is consuming 5% of the available persistent resources, the computing device 402 will continue to target a 50/50 renewable runtime resource allocation/split. Thus, in accordance with embodiments of the invention, as long as the resource consumption value stays below the predetermined resource allocation target, no changes are made to the runtime targets.

At step 706, if the resource consumption value is above the predetermined threshold value (i.e., a predetermined resource allocation target) of a workload (e.g., workload A or workload B), the computing device 402 makes a temporary adjustment to the renewable runtime resource targets of workload A and/or B in proportion to the resource consumption value. In embodiments, the dynamic persistent resource weighting module 414 of the computing device 402 implements step 706.

In implementations of the invention, if the target resource distribution for workloads A-N in the system is T(A) . . . T(N), then after admission or departure of a job, the computing device 402 computes the resource consumption value for each service class V(T(x)) of workloads A-N, and if the resource consumption value is greater than T(x), the resource allocation target for the associated workload is raised to V(T(x)). The computing device 402 then computes (adds up) the total change (delta) across all such service classes and temporarily subtracts that amount across the remaining service classes in proportion to the size of their resource targets relative to each other. In one example, a resource consumption value of 70% results in an increase in the runtime target of the workload A from 50% to 70%, and a reduction of the workload B from 50% to 30%, such that 100% of renewable runtime resources are allocated between the workload A and workload B.

At step 707, the computing device 402 determines if the resource consumption value is below or equal to the predetermined threshold value (e.g., a predetermined resource allocation target) of either workload A or workload B based on a determination that a job of workloads A or B has exited the computer system (e.g., has been competed).

At step 708, if the computing device 402 determines at step 707 that the resource consumption value is below or equal to the predetermined threshold value (e.g., a predetermined resource allocation target) of either workload A or workload B, the computing device 402 reverts back to the original renewable runtime resource targets (based on the predetermined resource allocation targets of workloads A and B).

At step 709, if the resource consumption value is determined to be above the predetermined threshold value (e.g., a predetermined resource allocation target) of a workload (e.g., workload A or workload B) at step 707, the computing device 402 makes a temporary adjustment to the renewable runtime resource targets of workload A and/or B in proportion to the resource consumption value, in accordance with step 706.

At step 710, the computing device 402 repeats 703-708 as necessary, as jobs are admitted to and exit the computer system. Based on the above, it can be understood that embodiments of the invention enable a specific workload to exceed its allotted persistent/fixed resource (e.g., memory unit and/or worker thread load) targets, and also enables a temporary adjustment to the renewable runtime resources (e.g., CPU, I/0, and/or network resources) targets in proportion to the resource consumption value, which reflects the actual persistent/fixed resources being consumed by a workload.

In embodiments, the adjustments made by the computing device 402 to the renewable runtime resource targets are made as part of the job scheduling module 410 admitting new jobs to the system and tracking jobs exiting the system, and therefore will adapt transparently, and will have an immediate effect on the renewable runtime resource distribution within the computer system.

In one illustrative example, a workload A and a workload B have predetermined resources allocations resulting in a 50/50 split of resources. In this example, workload A consumes 50% of available persistent resources, but a workload B only consumes 5% of available persistent resources. Since workload A is scheduled by the computing device 402 with a flexible resource allocation, the computing device 402 increases the resource consumption value of workload A from 50% to 70% of the total available persistent resources, while the workload B continues to consume 5% of the available persistent resources. In this example, the computing device 402 increases the renewable runtime resource target for workload A proportionally by the same amount, resulting in a renewable runtime resource target increasing from 50% to 70% for workload A. The computing device 402 also decreases the renewable runtime resource target for workload B proportionally, resulting in a decrease in the renewable runtime resource target for the workload B from 50% to of 30% of the total renewable runtime resources (to reflect the changes in job scheduling weighting). In this example, as jobs in workload A complete and persistent resources are relinquished, the temporary increased runtime target of 70% for the workload A will be reduced back to its original renewable runtime resource target of 50%, and the temporary renewable runtime resource target of 30% for workload B will be increased back to its original renewable runtime resource target of 50%. As an example, if the consumption of persistent resources by workload A reduces to 45% of available persistent resources, and workload B continues to consume 5% of the available persistent resources, the computing device 402 will revert to the original renewable runtime resource target split of 50/50 for the workloads A and B.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    calculating, by a processor, a resource consumption value of a first workload having at least one first service class by weighted aggregation of allocation values of persistent resources currently allocated to the at least one first service class of the first workload by the processor using predetermined resource weighting values, a service class being a recognizable logical grouping of active jobs identifiable by a respective session attribute within a workload;
    determining, by the processor, that the resource consumption value of the first workload is greater than a predefined resource allocation target for the first workload;
    scheduling, by the processor, execution of incoming jobs from the first workload and incoming jobs from a second workload having at least one second service class, wherein the scheduling is based on capacity limits of a system, the capacity limits of the system comprising a total amount of memory available; and
    temporarily and automatically adjusting, by the processor, a first renewable runtime resource target of the first workload from an initial target value to a first temporary target value proportional to the calculated resource consumption value by adjusting a second renewable runtime resource target of the second workload proportional to the adjustment of the first renewable runtime resource target of the first workload and temporarily sharing resources of the second workload and the first workload based on the adjustment of the first renewable runtime resource target of the first workload.

2. The method of claim 1, wherein the persistent resources comprises one or more memory units and worker threads, a renewable runtime resource associated with the renewable runtime resource target comprises a central processing unit (CPU), and the weighting values comprise neutral weightings, the neutral weightings representing a relative share value applicable across both persistent resources and renewable runtime resources; and
    wherein the memory units have a different weighting than the worker threads.

3. The method of claim 1, wherein the calculating the resource consumption value is initiated by the processor based on a determination that a new job of the first workload or another workload has been admitted to the system.

4. The method of claim 1, wherein the temporarily adjusting the first renewable runtime resource target of the first workload comprises increasing the first initial target value an amount in proportion to the resource consumption value.

5. The method of claim 1, wherein scheduling the execution of incoming jobs from the first workload and incoming jobs from the second workload is further based on: the predefined resource allocation target for the first workload; and a second predefined resource allocation target for the second workload; and
wherein the capacity limits of the system further comprises a total number of worker threads available for a duration of time.

6. The method of claim 1, further comprising:
determining, by the processor, that one or more jobs of the first workload have completed;
reverting, by the processor, the renewable runtime resource target of the first workload back to the initial target value; and
reverting, by the processor, the second renewable runtime resource target of the second workload back to the second initial target value.

7. The method of claim 1, wherein the processor includes software provided as a service in a cloud environment.

8. A computer program product comprising one or more computer readable storage media having program instructions collectively stored on the one or more computer readable storage media, the program instructions executable by a processor managing execution of jobs in a system to:
calculate a resource consumption value of a first workload having at least one first service class by weighted aggregation of allocation values of persistent resources currently allocated to the at least one first service class of the first workload by a job scheduling module using predetermined resource weighting values, a service class being a recognizable logical grouping of active jobs identifiable by a respective session attribute within a workload;
determine whether the resource consumption value of the first workload is greater than a predefined resource allocation target for the first workload in response to a job being admitted into the system;
schedule execution of incoming jobs from the first workload and incoming jobs from a second workload having at least one second service class, wherein the scheduling is based on capacity limits of the system, the capacity limits of the system comprising a total amount of memory available; and
temporarily and automatically increase a first renewable runtime resource target of the first workload from an initial target value of the first workload to a first temporary target value of the first workload proportional to the calculated resource consumption value, by decreasing a second renewable runtime resource target of the second workload proportional to the increase of the first renewable runtime resource target of the first workload and temporarily applying resources of the second workload to the first workload, in response to determining that the resource consumption value of the first workload is greater than the predefined resource allocation target for the first workload.

9. The computer program product of claim 8, wherein the predefined resource allocation target for the first workload is a soft target enabling the processor to exceed the predefined resource allocation target for the first workload in response to determining that a portion of the persistent resources are not otherwise allocated in the system.

10. The computer program product of claim 9, wherein the program instructions are further executable by the processor to:
determine that one or more jobs of the first workload have completed such that the resource consumption value of the first workload is less than the predefined resource allocation target for the first workload; and
in response to determining that the renewable runtime resource target of the first workload is the temporary target value, revert the renewable runtime resource target from the temporary target value back to the initial target value of the first workload.

11. The computer program product of claim 9, wherein the program instructions are further executable by the processor to decrease the second renewable runtime resource target of a second workload from an initial target value of the second workload to a second temporary target value in response to increasing the initial target value of the first workload.

12. The computer program product of claim 8, wherein the program instructions are further executable by the processor to maintain the initial target value of the first workload in response to determining the resource consumption value of the first workload is less than or equal to the predefined resource allocation target for the first workload.

13. The computer program product of claim 8, wherein scheduling the execution of incoming jobs from the first workload and the second workload is further based on: the predefined resource allocation target for the first workload; and a second predefined resource allocation target for the second workload; and
wherein the capacity limits of the system further comprises a total number of threads available for a duration of time, and wherein a predetermined resource weighting value for the total amount of memory is higher than a predetermined resource weighting value for the number of worker threads available.

14. A system comprising:
a processor, a computer readable memory, one or more computer readable storage media, and program instructions collectively stored on the one or more computer readable storage media, the program instructions executable to:
calculate a resource consumption value of a first workload having at least one first service class by weighted aggregation of allocation values of persistent resources currently allocated to the at least one first service class of the first workload by a job scheduling module using predetermined resource weighting values, a service class being a recognizable logical grouping of active jobs identifiable by a respective session attribute within a workload;
determine whether the resource consumption value of the first workload is greater than a user-defined resource allocation target for the first workload in response to a job of the first workload or another workload being admitted into the system;
schedule execution of incoming jobs from the first workload and incoming jobs from a second workload having at least one second service class, wherein the scheduling is based on capacity limits of the system, the capacity limits of the system comprising a total amount of memory available;
temporarily and automatically increase a first renewable runtime resource target of the first workload from an initial target value of the first workload to a temporary target value of the first workload proportional to the calculated resource consumption value, by decreasing a second renewable runtime resource target of the second workload proportional to the increase of the first renewable runtime resource target of the first workload and temporarily applying resources of the second workload to the first workload, in response to determining that the resource consumption value of the first workload is greater than the user-defined resource allocation target for the first workload; and determine whether to revert the renewable runtime resource target from the temporary target value of the first workload to the initial target value of the first workload in response to a job of the first workload completing.

15. The system of claim 14 wherein the program instructions are further executable to maintain the initial target value of the first workload in response determining the resource consumption value of the first workload is less than or equal to the user-defined resource allocation target for the first workload.

16. The system of claim 14, wherein the program instructions are further executable to temporarily decrease a renewable runtime resource target of the second workload from an initial target value of the second workload to a second temporary target value in response to the increase to the initial target value of the first workload.

17. The system of claim 14, wherein: the program instructions are further executable to schedule execution of incoming jobs from the first workload and the second workload the scheduling based on: the user-defined resource allocation target for the first workload; a second user-defined resource allocation target for the second workload; and capacity limits of the system; and the incoming jobs are based on structured query language (SQL) requests.

18. The system of claim 14, wherein the program instructions are further executable to:

calculate a resource consumption value of the second workload by aggregating allocation values of persistent resources currently allocated to the second workload;

determine whether the resource consumption value of the second workload is greater than a user-defined resource allocation target for the second workload when the job of the first workload or the another workload is admitted into the system; and temporarily increase a renewable runtime resource target of the second workload from an initial target value of the second workload to a temporary target value of the second workload in response to determining that the resource consumption value of the second workload is greater than the user-defined resource allocation target for the second workload.

19. The system of claim 14, wherein the user-defined resource allocation target for the first workload is a soft target enabling the system to exceed the user-defined resource allocation target for the first workload when a portion of the persistent resources are not otherwise allocated in the system.

20. The system of claim 14, wherein the processor includes software provided as a service in a cloud environment.

* * * * *